United States Patent
Sawamoto (10) Patent No.: US 8,290,698 B2
(45) Date of Patent: Oct. 16, 2012

(54) VEHICLE TRAVEL CONTROL APPARATUS

(75) Inventor: Kiichiro Sawamoto, Kuki (JP)

(73) Assignee: Honda Motor Co., Ltd., Tokyo (JP)

( * ) Notice: Subject to any disclaimer, the term of this patent is extended or adjusted under 35 U.S.C. 154(b) by 1232 days.

(21) Appl. No.: 12/061,341

(22) Filed: Apr. 2, 2008

(65) Prior Publication Data

US 2008/0249688 A1    Oct. 9, 2008

(30) Foreign Application Priority Data

Apr. 4, 2007    (JP) ................. P2007-098140

(51) Int. Cl.
*G08G 1/16* (2006.01)

(52) U.S. Cl. ......... 701/301; 701/48; 701/300; 701/302; 340/435; 340/436; 342/455

(58) Field of Classification Search ............... 701/48, 701/300, 301, 302; 340/435, 436; 342/455
See application file for complete search history.

(56) References Cited

U.S. PATENT DOCUMENTS

| | | | | |
|---|---|---|---|---|
| 6,018,308 A * | 1/2000 | Shirai | .............. | 342/70 |
| 6,282,483 B1 * | 8/2001 | Yano et al. | ............. | 701/96 |
| 6,484,087 B2 * | 11/2002 | Shirai et al. | ............. | 701/96 |
| 6,683,969 B1 * | 1/2004 | Nishigaki et al. | ............ | 382/104 |
| 6,834,231 B2 * | 12/2004 | Koike et al. | .............. | 701/301 |
| 6,987,864 B2 * | 1/2006 | Nishigaki et al. | ............ | 382/104 |
| 7,451,033 B2 * | 11/2008 | Xu et al. | ............. | 701/70 |
| 7,835,865 B2 * | 11/2010 | Okazaki et al. | ............. | 701/300 |
| 2002/0138192 A1 | 9/2002 | Lueder et al. | | |
| 2004/0117090 A1 | 6/2004 | Samukawa et al. | | |
| 2005/0010351 A1 | 1/2005 | Wagner et al. | | |
| 2005/0216170 A1 * | 9/2005 | Heinrichs-Bartscher | ....... | 701/96 |
| 2005/0251323 A1 | 11/2005 | Heinrichs-Bartscher | | |
| 2006/0089801 A1 * | 4/2006 | Sawamoto | .................... | 701/301 |
| 2006/0163940 A1 * | 7/2006 | Alvarez et al. | ................ | 303/146 |

FOREIGN PATENT DOCUMENTS

| | | |
|---|---|---|
| EP | 0 657 857 A1 | 6/1995 |
| JP | 07-096849 A | 4/1995 |
| JP | 07-220199 A | 8/1995 |
| JP | 2000-009841 A | 1/2000 |
| JP | 2005-212522 A | 8/2005 |
| JP | 2006-327271 A | 12/2006 |
| WO | WO 01/79013 A1 | 10/2001 |
| WO | WO 02/21156 A2 | 3/2002 |

OTHER PUBLICATIONS

Japanese Language Office Action dated Sep. 13, 2011.

* cited by examiner

*Primary Examiner* — Thomas G. Black
*Assistant Examiner* — Peter D Nolan
(74) *Attorney, Agent, or Firm* — Arent Fox LLP (57) ABSTRACT

A vehicle travel control apparatus including an object detector, a yaw-rate detector, a vehicle speed detector, a movement path estimator, a preceding vehicle assignment device, a travel controller, a still object determination device, and a stable-movement-state determination device, wherein the preceding vehicle assignment device avoids assigning the object as the preceding vehicle, or assigns the object as the preceding vehicle after waiting for a predetermined time, when: the present vehicle performs the follow-travel control targeting the preceding vehicle; the object detected at a position between the preceding vehicle and the present vehicle is determined to be the still object by the still object determination device; and the present vehicle is determined to be in the stable-movement-state by the stable-movement-state determination device.

8 Claims, 8 Drawing Sheets

VEHICLE TRAVEL CONTROL APPARATUS

BACKGROUND OF THE INVENTION

Priority is claimed on Japanese Patent Application No. 2007-98140, filed Apr. 4, 2007, the contents of which are incorporated herein by reference.

FIELD OF THE INVENTION

The present invention relates to a vehicle travel control apparatus for performing a follow-travel control of the present vehicle following a preceding vehicle.

DESCRIPTION OF RELATED ART

A technology is proposed related to a radar device which is utilized as an object detection device, by emitting laser in the forward direction of the present vehicle, and receiving the reflected light from an object such as a preceding vehicle (for example, in Japanese Unexamined Patent Application, First Publication No. 2000-9841).

In addition, a technology is proposed related to a vehicle travel control apparatus which recognizes the preceding vehicle driving ahead of the present vehicle by the radar device, and performs a follow-travel control of the present vehicle, by performing an inter-vehicle distance control with the preceding vehicle.

In addition, a technology is proposed related to a vehicle travel control apparatus, which is designed to perform a follow-travel control on an overcrowded road, by performing an inter-vehicle distance control of the present vehicle while a preceding vehicle is in a low-speed state until the preceding vehicle comes to a halted state, and by maintaining the present vehicle in a halted state while the preceding vehicle is in the halted state.

In the vehicle travel control apparatus, the expected movement path of the present vehicle is calculated based on the yaw-rate of the present vehicle, and the objects which exist on the expected movement path are recognized as vehicle-control-targets, that is, for example, the preceding vehicle.

When the present vehicle follows a preceding vehicle, if the present vehicle and the preceding vehicle passes an object on the road, or an object over the road (e.g. a low-height gate), at the time the preceding vehicle passes the object on/over the road, the object on/over the road becomes the closest object on/over the road which exists on the expected movement path of the present vehicle. In this circumstance, if the vehicle travel control apparatus switches the vehicle-control-target from the preceding vehicle to the object on/over the road, and operated a vehicle control based on the new vehicle-control-target, this operation may not represent the driver's intention.

In order to resolve the above problem, several methods of technologies can be used. For example, the resolution of the radar in the vertical direction may be improved, and vehicles can be distinguished from other objects on the road or over the road, so that non-vehicle objects would not be recognized as a vehicle-control-target. However, in order to improve the resolution in the vertical direction, a device for scanning in the vertical direction is necessary, making the system more complex and costly.

On the other hand, the beam width of the radar in the vertical direction may be narrowed, so that the objects on/above the road become out of the range. However, in this way, the detection robustness of the preceding vehicle during the pitching movement of the present vehicle would become deteriorated, and the problem arises that the preceding vehicle may not be detected.

In consideration of the above circumstances, the object of the present invention is to provide a vehicle travel control apparatus which does not assign still objects on the road or still objects over the road as a vehicle-control-target.

SUMMARY OF THE INVENTION (1) In order to achieve the above object, the present invention provides a vehicle travel control apparatus including: an object detector which detects an object that exists in an advancing direction of a present vehicle; a yaw-rate detector which detects the yaw-rate of the present vehicle; a vehicle speed detector which detects the speed of the present vehicle; a movement path estimator which estimates the movement path of the present vehicle, based on the output of the yaw-rate detector and the output of the vehicle speed detector; a preceding vehicle assignment device which assigns the object as a preceding vehicle; a travel controller which performs a follow-travel control targeting the preceding vehicle; a still object determination device which determines whether the object detected by the object detector is a still object; and a stable-movement-state determination device which determines whether the present vehicle is in a stable-movement-state, based on the output of the yaw-rate detector, wherein the preceding vehicle assignment device avoids assigning the object as the preceding vehicle, or assigns the object as the preceding vehicle after waiting for a predetermined time, when: the present vehicle performs the follow-travel control targeting the preceding vehicle; the object detected at a position between the preceding vehicle and the present vehicle is determined to be the still object by the still object determination device; and the present vehicle is determined to be in the stable-movement-state by the stable-movement-state determination device.

When the present vehicle performs a follow-travel control targeting a preceding vehicle, and the present vehicle is in a stable-movement-state, there is no possibility of a still vehicle emerging between the present vehicle and the preceding vehicle. Therefore, while the present vehicle performs a follow-travel control targeting the preceding vehicle, and the present vehicle is in a stable-movement-state, if a still object emerges between the present vehicle and the preceding vehicle, the still object is not determined to be another preceding vehicle, and accordingly, the still object is not recognized as a new vehicle-control-target.

According to the vehicle travel control apparatus, while the present vehicle performs a follow-travel control targeting a preceding vehicle and the present vehicle is in a stable-movement-state, if a still object emerges between the present vehicle and the preceding vehicle, by not determining the still object as another preceding vehicle, and accordingly, not recognizing the still object as a new vehicle-control-target, it can be avoided that the present vehicle performs a follow-travel control targeting the still objects on/above the road that exist on the expected movement path of the present vehicle.

(2) It may be arranged such that the stable-movement-state determination device determines that the present vehicle is in the stable-movement-state, when the absolute value of the integral value of the yaw-rate over a predetermined period is equal to or less than a predetermined value.

In this case, the yaw-angle of the present vehicle can be calculated based on the integral value of the yaw-rate. Therefore, the stable-movement-state of the present vehicle can be determined based on the variation of yaw-angle within a predetermiined amount of time.

(3) It may be arranged such that the stable-movement-state determination device determines that the present vehicle is in a stable-movement-state, when the absolute value of a lateral movement amount of the present vehicle in a predetermined period, calculated based on the yaw-rate and the speed of the present vehicle, is equal to or less than a predetermined value.

In this case, the stable-movement-state of the present vehicle can be determined based on the lateral movement amount of the present vehicle in a predetermined amount of time.

DETAILED DESCRIPTION OF THE INVENTION

Hereinafter, one embodiment of a vehicle travel control apparatus according to the present invention will be described with reference to FIGS. 1 to 11.

Figure 1:
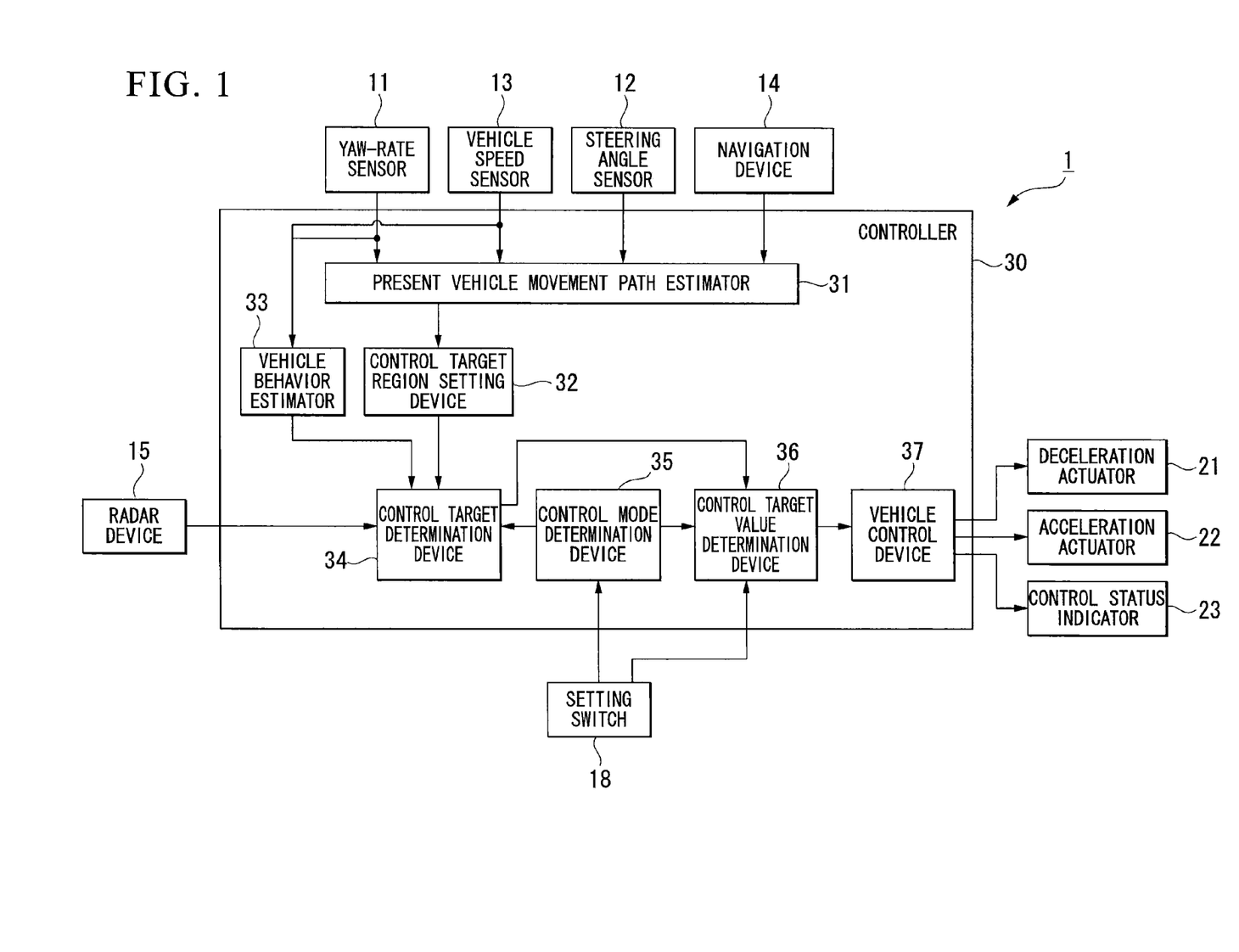
FIG. 1 is a function block diagram of the vehicle travel control apparatus according to one embodiment of the present invention.

As shown in the function block diagram of FIG. 1, the vehicle travel control apparatus 1 according to the present invention is provided in a vehicle having a yaw-rate sensor (yaw-rate detector) 1, steering angle sensor 12, a vehicle speed sensor (vehicle speed detector) 13, a navigation device 14, a radar device (object detector) 15, a setting switches 18, a deceleration actuator 21, an acceleration actuator 22, a control status indicator 23, and a controller 30.

The yaw-rate sensor 11 detects the yaw-rate of the present vehicle. The steering angle sensor 12 detects the steering angle of the present vehicle. The vehicle speed sensor 13 detects the vehicle speed of the present vehicle. All three of the above detectors output detection signals corresponding to the detection results to the controller 30.

By performing a map-matching, for example, to the map data stored in the device, the navigation device 14 calculates the current position of the present vehicle, based on the current positional information acquired utilizing a GPS (Global Positioning System) or a D-GPS (Differential GPS). Based on the calculated current position, the navigation device 14 performs route searches and route navigations to the destinations, and outputs information including the current position of the present vehicle, to the controller 30.

The radar device 15 (object detector) transmits electromagnetic waves including laser light, millimeter-waves or the like, aiming at a detection range, which is in an appropriate detection direction (e.g. in the advancing direction of the present vehicle). Moreover, when the transmitted electromagnetic waves are reflected by the external objects (e.g. a preceding vehicle), the radar device 15 receives the reflected waves, produce a beat signal by mixing the transmitted electromagnetic waves with the received electromagnetic waves (reflected waves), and outputs the beat signal to the controller 30.

The setting switches 18 include various switches operated by the driver for setting the operative instructions to the drive control system. The setting switches 18 include, for example: a drive control main switch (drive control switch) which activates/deactivates the drive control system; a control mode switch by which the operator can chose either one of an inter-vehicle distance control mode or a cruise mode with an inter-vehicle distance control function; an acceleration/deceleration switch by which the set vehicle speed for the cruise control is increased/decreased; an inter-vehicle distance setting switch which configures the amount of the inter-vehicle distance while performing an inter-vehicle distance control. The setting switches 18 output the operation signal to the controller 30, according to the operative instructions.

The operator can, by operating the control mode switch of the setting switches 18 in the vehicle travel control apparatus 1, chose either one mode of: an inter-vehicle distance control mode which performs only an inter-vehicle distance control targeting the preceding vehicle; or a cruise mode with an inter-vehicle distance control function, which performs an inter-vehicle distance control with the preceding vehicle when a target of the inter-vehicle distance control does exit, and maintains the present vehicle speed at a constant value when a target of the inter-vehicle distance control does not exit.

The deceleration actuator 21 controls, for example, the throttle opening or the break fluid pressure, according to the command from the controller 30, so as to decelerate the present vehicle.

The control status indicator 23 indicates the information input from the controller 30 by using display devices of meters or the like, to the driver.

The controller 30 includes, a present vehicle movement path estimator 31 (movement path estimator), a control target region setting device 32, a vehicle behavior estimator 33 (stable-movement-state determination device), a control target determination device 34 (preceding vehicle assignment device), a control mode determination device 35, a control target value determination device 36, and a vehicle control device 37 (travel controller).

The present vehicle movement path estimator 31 collects information including: detection signals (outputs) from the yaw-rate sensor 11, the steering angle sensor 12, and the vehicle speed sensor 13; and the information of the present vehicle, e.g. the current position, calculated by the navigation device 14.

The present vehicle movement path estimator 31 calculates an estimated movement path of the present vehicle, based on the above listed input information, and outputs the estimation result to the control target region setting device 32.

Figure 2:
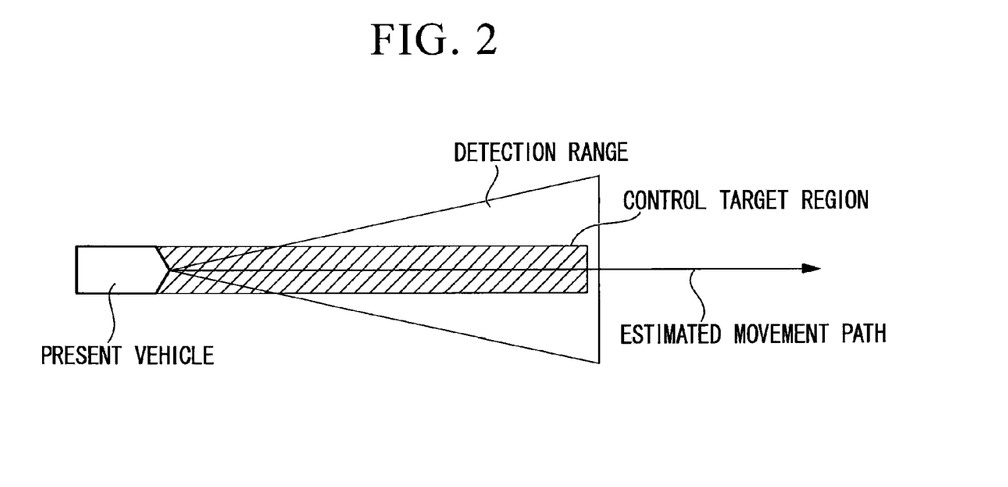
FIG. 2 is a drawing showing the control target region of the vehicle travel control apparatus, according to the embodiment.

The control target region setting device 32 assigns a region on the road having a predetermined distance range and a basic width orthogonal to the estimated movement path of the present vehicle, and extending along with the estimated movement path, as a control target region (hereinafter, called simply as the control target region). The control target region setting device 32 outputs the assigned control target region to the control target determination device 34. FIG. 2 illustrates the relationship between the detection range of the radar device 15 and the control target region, as assigned by the control target region setting device 32.

The vehicle behavior estimator 33 determines whether the present vehicle is in a stable-movement-state, by estimating the behavior of the present vehicle based on the detection signals (outputs) from the yaw-rate sensor 11 and the vehicle speed sensor 13.

For example, the vehicle behavior estimator 33 calculates the absolute orientation of the present vehicle based on the yaw-angle calculated by integrating the yaw-rate of the present vehicle, detected by the yaw-rate sensor 11.

Furthermore, the vehicle behavior estimator 33 calculates the lateral movement amount of the present vehicle per a predetermined amount of time, based on the present vehicle speed detected by the vehicle speed sensor 13 and the absolute orientation of the present vehicle.

Furthermore, the vehicle behavior estimator 33 determines whether the present vehicle is in a stable-movement-state, based on the yaw-angle of the present vehicle per the predetermined amount of time or the lateral movement amount of the present vehicle per the predetermined amount of time. Thereafter, the vehicle behavior estimator 33 outputs the determination result to the control target determination device 34.

Figure 3:
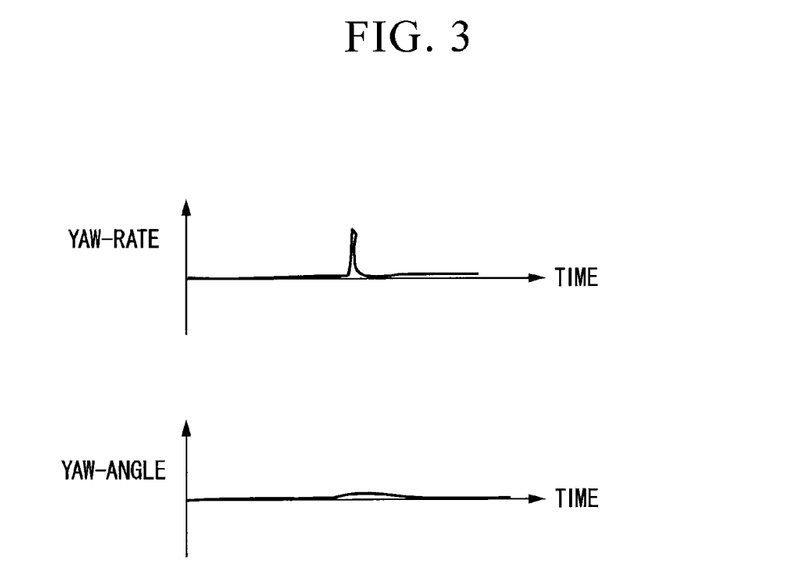
FIG. 3 includes graphs showing variations of the yaw-rate and the yaw-angle of the present vehicle, when the yaw-rate changes transitionally.

For example, as shown in FIG. 3, when the present vehicle is stably moving, the yaw-rate and the yaw-angle do not change. At a time the present vehicle momentarily wobbles, an temporal variation of the yaw-rate of the present vehicle can be observed, while the yaw-angle thereof remains substantially unchanged.

Figure 4:
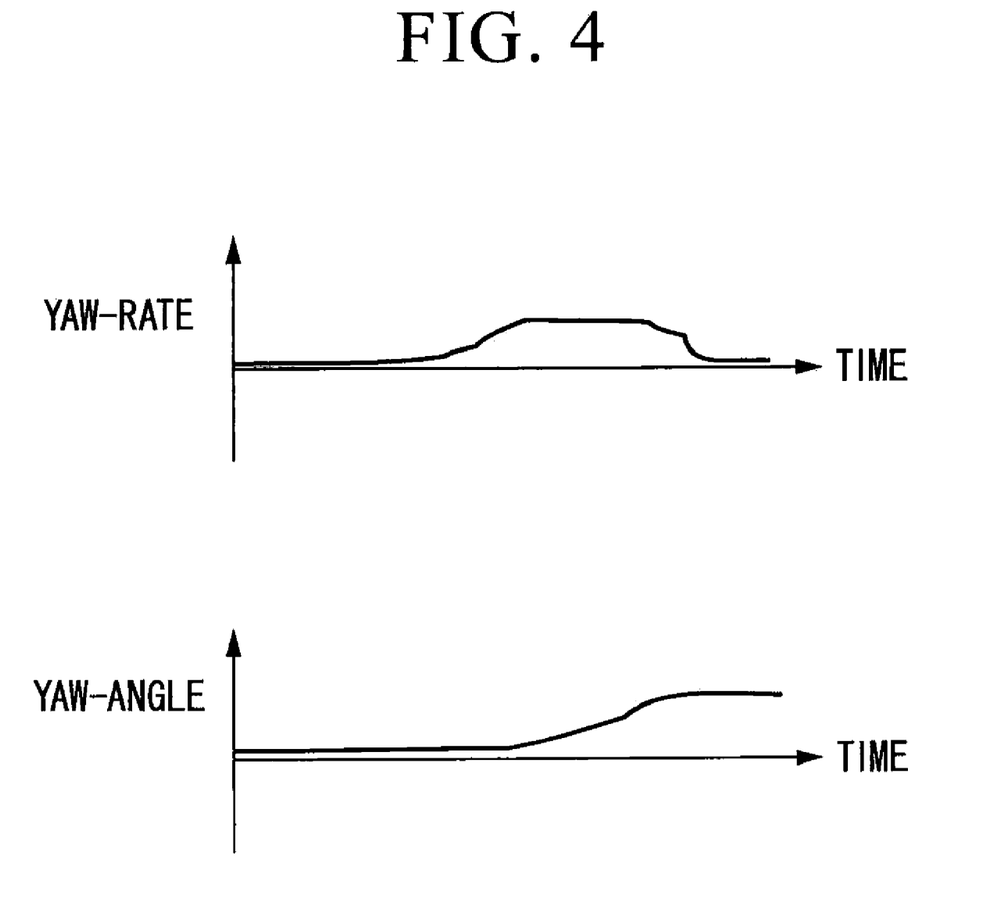
FIG. 4 includes graphs showing variations of the yaw-rate and the yaw-angle of the present vehicle, when the yaw-rate makes a change over a certain amount of time.

On the other hand, as shown in FIG. 4, at a time the present vehicle makes a lane change, or when the present vehicle runs on a curved road, the yaw-rate thereof shows a variation for a certain amount of time, and a substantial yaw-angle emerges.

Accordingly, for example, when the absolute value of the yaw-angle variation of the present vehicle in a predetermined amount of time is equal to or less than a predetermined value, or, when the absolute value of the lateral movement variation of the present vehicle in a predetermined amount of time is equal to or less than a predetermined value, the present vehicle can be determined to be in a stable-movement-state.

The control target determination device 34 extracts objects existing in the control target region assigned by the control target region setting device 32, from among the object detection data detected by the radar device 15. Moreover, the control target determination device 34 calculates the relative distance, relative velocity and the like, between said object and the present vehicle. Furthermore, the control target determination device 34 determines whether said object existing in the control target region should be assigned as the follow-control-target, based on the movement characteristics and the behavior of the present vehicle estimated by the vehicle behavior estimator 33.

Moreover, when the control target determination device 34 determined that said object is a preceding vehicle which should be assigned as the follow-control-target, the control target determination device 34 outputs the information including the relative distance, relative velocity and the like, between the assigned preceding vehicle and the present vehicle, to the control target value determination device 36.

The control mode determination device 35 determines whether the control mode of the present vehicle is the inter-vehicle distance control mode or the cruise mode with the inter-vehicle distance control function, based on the control mode switch of the setting switches 18 and the vehicle control status of the present vehicle. The control mode determination device 35 outputs the determination result to the control target determination device 34 and the control target value determination device 36.

The control target value determination device 36 determines the target inter-vehicle distance, based on the output from the inter-vehicle distance setting switch. Based on the determined target inter-vehicle distance and the information input from the control target determination device 34 including the relative distance, relative velocity and the like, between the preceding vehicle and the present vehicle, the control target value determination device 36 determines control target values necessary for the follow-travel control, including the target vehicle speed, target acceleration/deceleration amount, and the like.

The inter-vehicle distance setting switch, for example, is a switch by which a target distance is selected, for example, from among three predetermined classes, e.g. short distance, middle distance, and long distance.

As another example, the inter-vehicle distance setting switch may be a switch by which a target time interval, for example, from among three predetermined classes, e.g. short time interval, middle time interval, and long time interval. Thereafter, the selected target time interval is converted to a target distance, by multiplying the selected target time interval by the present vehicle speed.

The vehicle control device 37 controls the deceleration actuator 21 and the acceleration actuator 22 according to the control target values (e.g. the target vehicle speed, the target acceleration/deceleration amount, and the like) which are determined by the control target value determination device 36. Moreover, the vehicle control device 37 outputs the present control status to the control status indicator 23.

Figure 5:
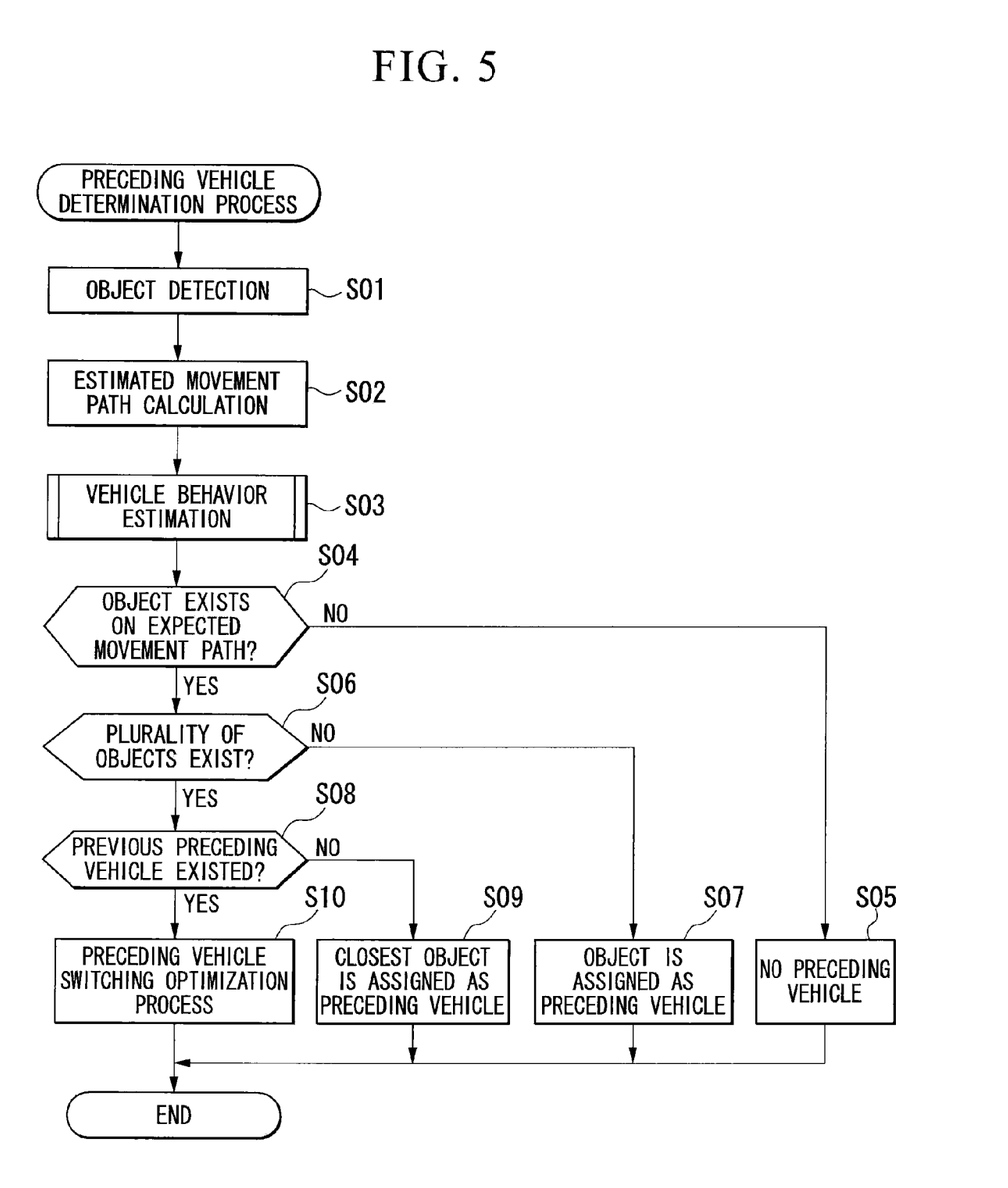
FIG. 5 is a flow chart showing the preceding vehicle determination process according to the embodiment.

The preceding vehicle determination process during the follow-travel control performed by the control target determination device 34 is explained with reference to the flow chart of FIG. 5. The preceding vehicle determination process shown in the flow chart of FIG. 5 is performed repeatedly at a predetermined time interval.

First, in step S01, an object is detected by the radar device 15.

Thereafter, the process proceeds to step S02, and an estimated movement path of the present vehicle is calculated.

Thereafter, the process proceeds to step S03, and a vehicle behavior estimation process is performed, in which the behavior of the present vehicle is estimated based on the outputs from the yaw-rate sensor 11 and the vehicle speed sensor 13. The vehicle behavior estimation process will be explained in detail in the following sections.

Thereafter, the process proceeds to step S04, and a determination is made, whether said object is on the expected movement path of the present vehicle.

If the determination result of step S04 is 'No', the process proceeds to step S05, concluding that a preceding vehicle does not exist. Thereafter, the present process ends.

If the determination result of step S04 is 'Yes', the process proceeds to step S06, and determines whether a plurality of objects exist on the expected movement path.

If the determination result of step S06 is 'No', the process proceeds to step S07, and assigns said object to the preceding vehicle. Thereafter, the present process ends.

If the determination result of step S06 is 'Yes', the process proceeds to step S08, and determines whether the previous execution of the preceding vehicle determination process determined that a preceding vehicle existed.

If the determination result of step S08 is 'No', i.e., a preceding vehicle did not exist in the previous execution of the preceding vehicle determination process, the process proceeds to step S09, and the object positioned closest to the present vehicle on the expected movement path of the present vehicle is assigned as the preceding vehicle.

If the determination result of step S08 is 'Yes', i.e., a preceding vehicle did exist in the previous execution of the preceding vehicle determination process, the process proceeds to step S10.

In step S110, the process determines a single object to be assigned as the preceding vehicle, from among the plurality of the objects, by performing a preceding vehicle switching optimization process. Thereafter the present process ends.

Figure 6:
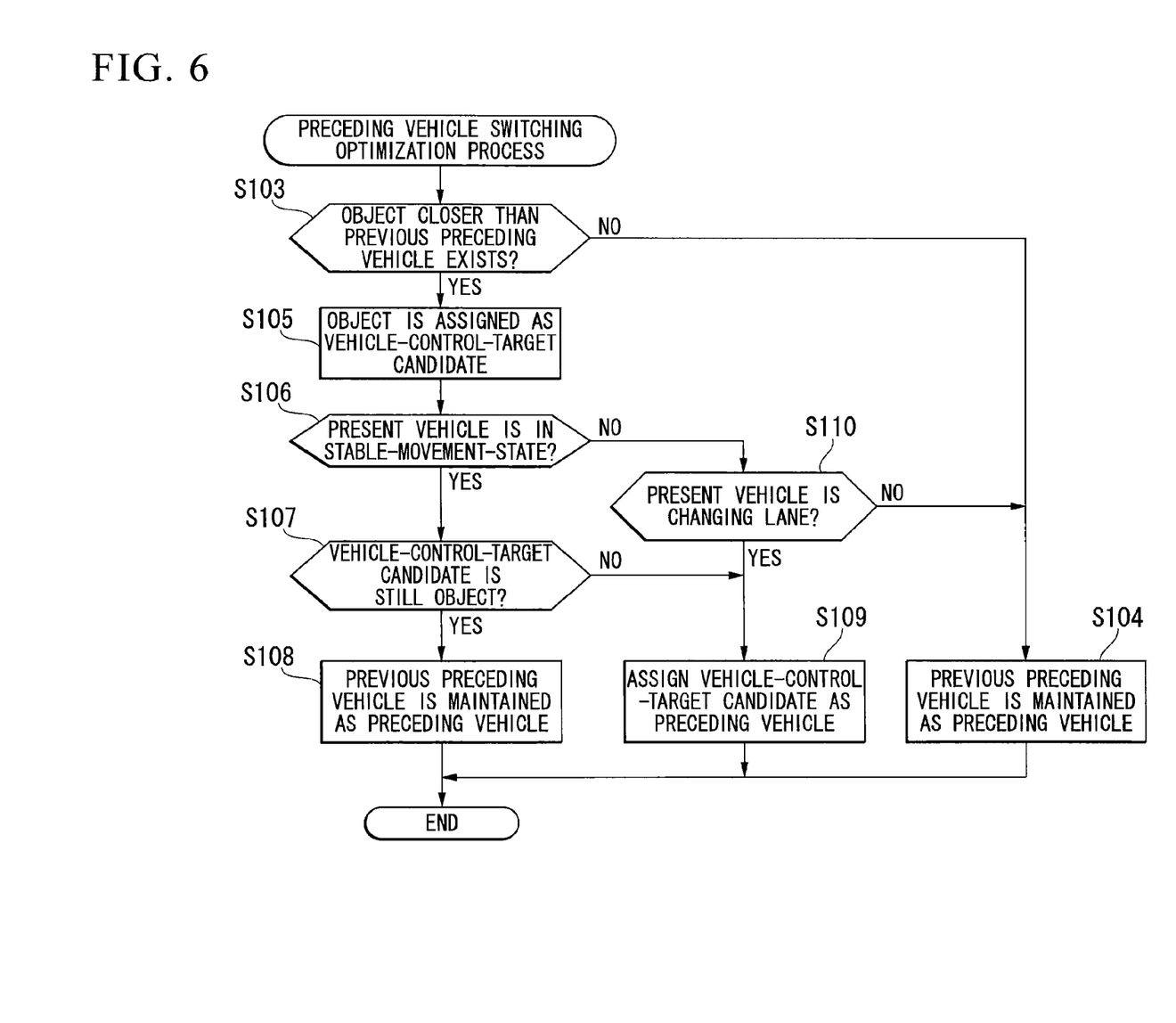
FIG. 6 is a flow chart showing the optimization process of the preceding vehicle switching according to the embodiment.

The preceding vehicle switching optimization process performed in step S10 is explained with reference to the flow chart of FIG. 6.

The preceding vehicle switching optimization process is performed repeatedly at a predetermined time interval.

In step S103, it is determined whether an object exists which is closer to the present vehicle than the preceding vehicle assigned in the previous execution of the preceding vehicle determination process (hereinafter, called previous preceding vehicle). That is, the process determines whether a new object exists between the present vehicle and the previous preceding vehicle.

If the determination result of step S103 is 'No', i.e., there was no closer object than the previous preceding vehicle, the process proceeds to step S104, and the process maintains the previous preceding vehicle as the preceding vehicle. Thereafter, the present process ends.

If the determination result of step S103 is 'Yes', i.e., there exists a closer object than the previous preceding vehicle, the process proceeds to step S105, and the process assigns said object closer than the previous preceding vehicle as a control target candidate.

Figure 7A:
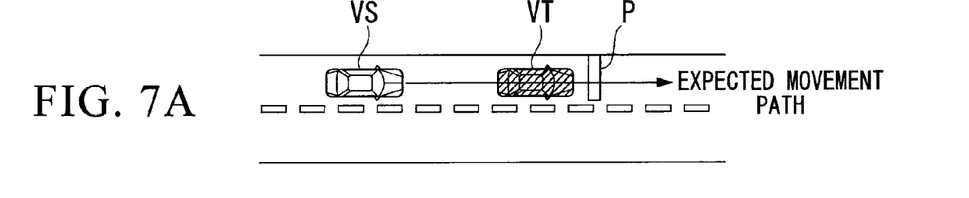
FIGS. 7A, 7B, and 7C are a time-series drawings, showing the present vehicle passing through an object on the road.
Figure 7B:
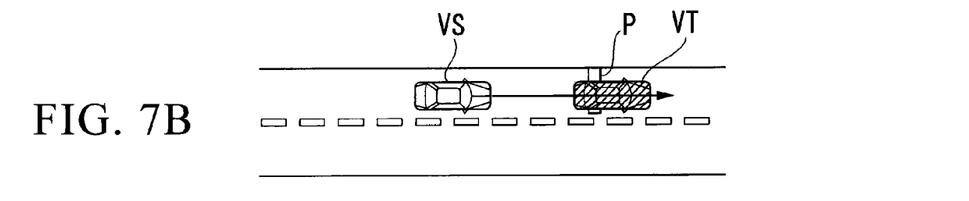

For example, as shown in FIGS. 7A to 7B, while the present vehicle VS is following the preceding vehicle, and an object on the road or over the road exists (hereinafter, called as the road object) in the advancing direction of the running lane of the present vehicle VS and the preceding vehicle VT (FIG. 7A), until the preceding vehicle VT passes the road object P, the preceding vehicle VT is closer to the present vehicle VS than the road object P. Therefore, the preceding vehicle VT on the expected movement path of the present vehicle VS remains recognized as the vehicle-control-target (FIG. 7B).

When the preceding vehicle VT completely passes the road object P, the road object P comes between the present vehicle VS and the preceding vehicle VT (FIG. 7C), and the road object P becomes a new vehicle-control-target candidate.

Figure 8A:
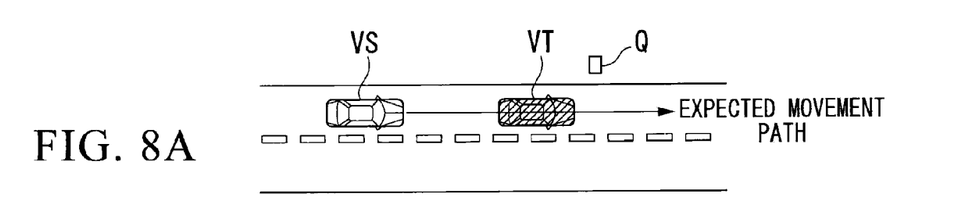
FIGS. 8A, 8B, and 8C are a time-series drawings, showing the present vehicle passing through an object at a side of the road.
Figure 8B:
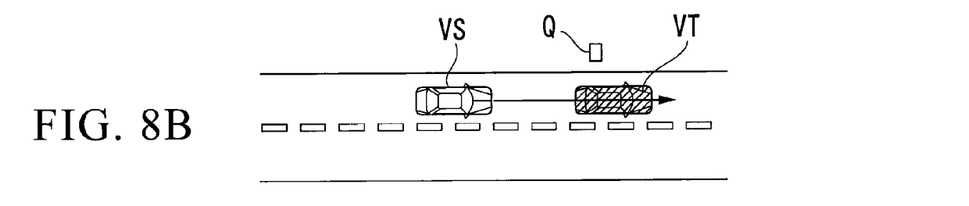
Figure 8C:
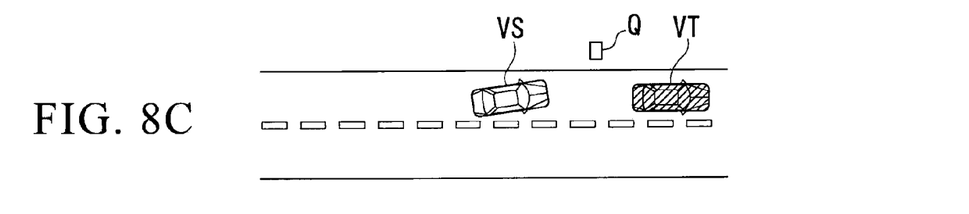

Moreover, as shown in FIGS. 8A to 8C, while the present vehicle VS is following the preceding vehicle VT, and an object Q exists at a side of the road (hereinafter, called as the road side object) in the advancing direction of the running lane of the present vehicle VS and the preceding vehicle VT (FIG. 8A), the preceding vehicle VT is closer than the road side object Q to the present vehicle VS, until the preceding vehicle VT passes by the road side object Q. Therefore, the preceding vehicle VT on the expected movement path of the present vehicle VS remains recognized as the vehicle-control-target (FIG. 8B).

When the preceding vehicle VT completely passes the road side object Q, the road side object Q comes between the present vehicle VS and the preceding vehicle VT (FIG. 8C), and the road side object Q becomes a new vehicle-control-target candidate.

Figure 9:
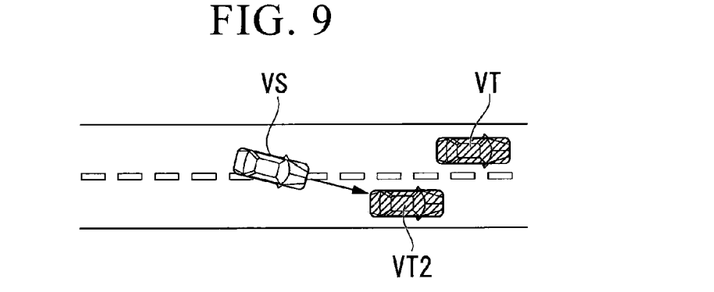
FIG. 9 is a drawing showing the present vehicle making a lane change.

Moreover, as shown in FIG. 9, while the present vehicle VS is following the preceding vehicle VT, and the present vehicle VS performs a steering operation in order to make a lane change to the next lane, if another vehicle VT2 exists on the next lane in the advancing direction of the present vehicle VS, but in the backward direction of the preceding vehicle VT, then the vehicle VT2 comes on the expected movement path of the present vehicle VS, and the vehicle VT2 becomes a new vehicle-control-target candidate.

Thereafter, the process precedes from step S105 to step S106, and whether the result of the vehicle behavior estimation process performed in step S03 of the preceding vehicle determination process was a stable-movement-state.

When the result of step S106 is 'Yes' (stable-movement-state), the process proceeds to step S107, and the process determines whether the vehicle-control-target candidate is a still object, based on the relative velocity of the vehicle-control-target candidate.

In this embodiment, the controller 30 functions as a still object determination device which determines whether an object is a still object, by performing the process of step S107.

When the result of step S107 is 'Yes' (still object), the process proceeds to step S108, and the process does not determine that the vehicle-control-target candidate is a new preceding vehicle. The present process maintains the previous preceding vehicle as the preceding vehicle. Thereafter the present process ends.

Figure 7C:
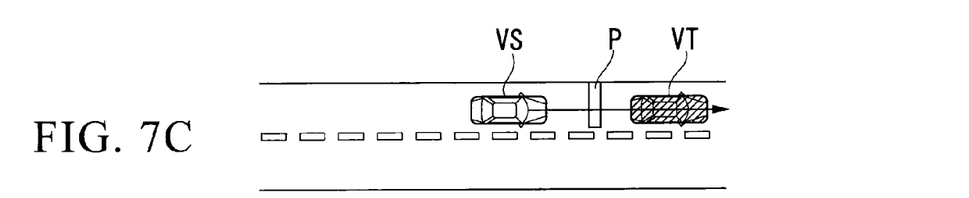

In other words, while the present vehicle performs the follow-travel control targeting the preceding vehicle, and a new vehicle-control-target candidate emerges between the present vehicle and the preceding vehicle, if the behavior of the present vehicle is stable, and the new vehicle-control-target candidate was a still object, then, since there is no possibility of a still vehicle emerging between the present vehicle and the preceding vehicle, the process determines that the new vehicle-control-target candidate is not a still vehicle, but an object on or above the road. The process does not assign such an object as the vehicle-control-target, and maintains the previous preceding vehicle which had been the vehicle-control-target, and performs the follow-travel control accordingly (FIG. 7).

On the other hand, if the result of step S107 is 'No' (not a still object), the process proceeds to step S109, and the process determines the vehicle-control-target candidate as the preceding vehicle. Thereafter the present process ends.

In other words, while the present vehicle performs the follow-travel control targeting the preceding vehicle, and a new vehicle-control-target candidate emerges between the present vehicle and the preceding vehicle, if the current behavior of the present vehicle is stable, and the new vehicle-control-target candidate was not a still object but a moving object, then, the process determines that another vehicle came between the present vehicle and the preceding vehicle. The process switches the assignment of the preceding vehicle, from the previous preceding vehicle to the new the vehicle-control-target candidate, and performs the follow-travel control accordingly.

When the result of step S106 is 'No' (not stable-movement-state), the process proceeds to S110, and the process determines whether the result of the vehicle behavior estimation process performed in step S03 of the preceding vehicle determination process was a lane-changing-state.

When the result of step S110 is 'Yes' (lane-changing-state), the process proceeds to S109, and the process determines to assign the vehicle-control-target candidate as the preceding vehicle. Thereafter the present process ends.

In other words, while the present vehicle performs the follow-travel control targeting the preceding vehicle, and a new vehicle-control-target candidate emerges between the present vehicle and the preceding vehicle, if the current behavior of the present vehicle is a lane change, then, the process determines that another vehicle is in the next lane. The process switches the assignment of the preceding vehicle, from the previous preceding vehicle to the new vehicle-control-target candidate, and performs the follow-travel control accordingly (FIG. 9).

On the other hand, if the result of step S110 is 'No' (not a lane change), the process proceeds to step S104, and the process determines not to assign the vehicle-control-target candidate as the preceding vehicle. Thereafter the present process ends.

In other words, while the present vehicle performs the follow-travel control targeting the preceding vehicle, and a new vehicle-control-target candidate emerges between the present vehicle and the preceding vehicle, if the current behavior of the present vehicle is not stable, and the present vehicle is not making a lane change, then, the process determines that the present vehicle is in a temporally unstable state (wobbling state). Accordingly, the process estimates that the new vehicle-control-target candidate is a road side object, and the process does not assign the new candidate as the vehicle-control-target. The process maintains the previous preceding vehicle as the preceding vehicle. Thereafter, the present process ends (FIG. 8).

The vehicle behavior estimation process performed in step S03 will be explained hereinafter, with reference to the flow chart of FIG. 10 and FIG. 12.

Figure 10:
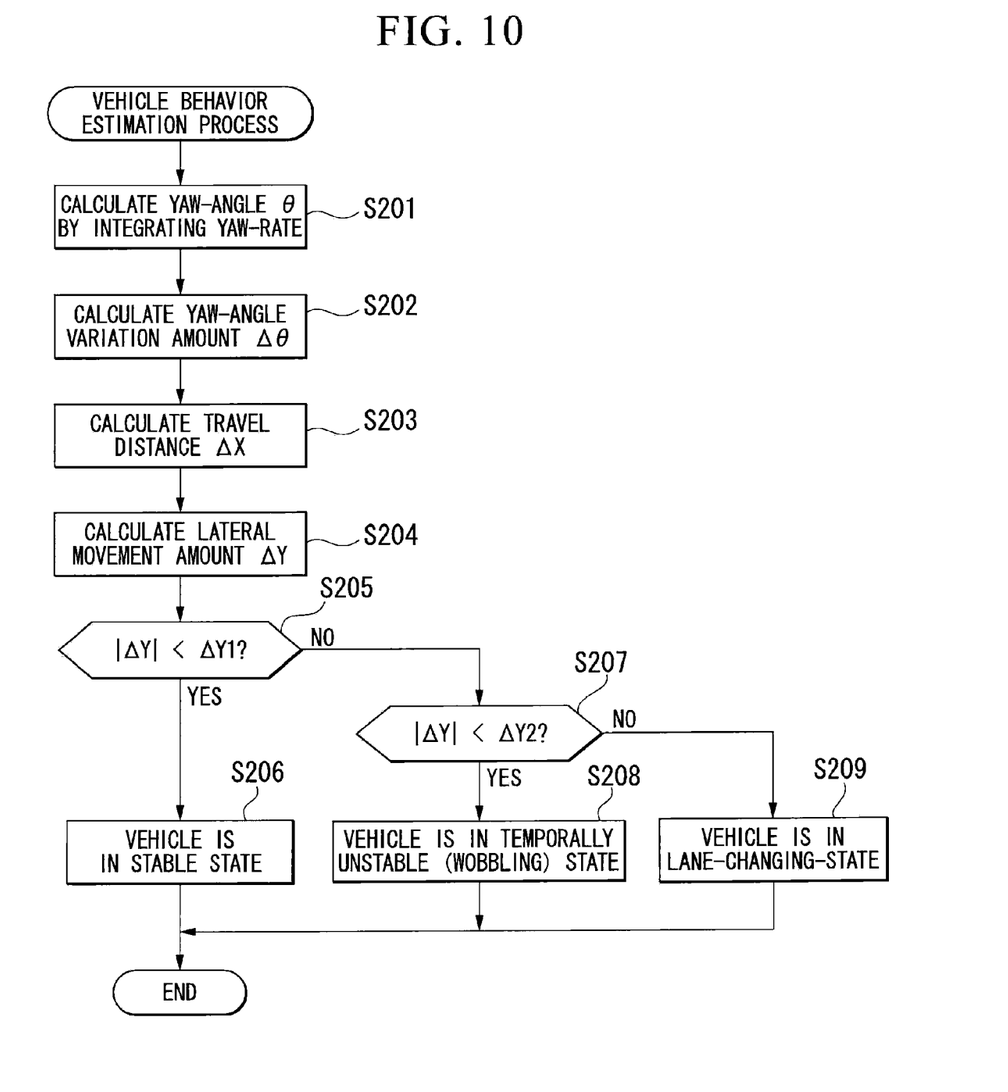
FIG. 10 is a flow chart showing a first vehicle behavior estimation process in the vehicle travel control apparatus according to the embodiment.
Figure 12:
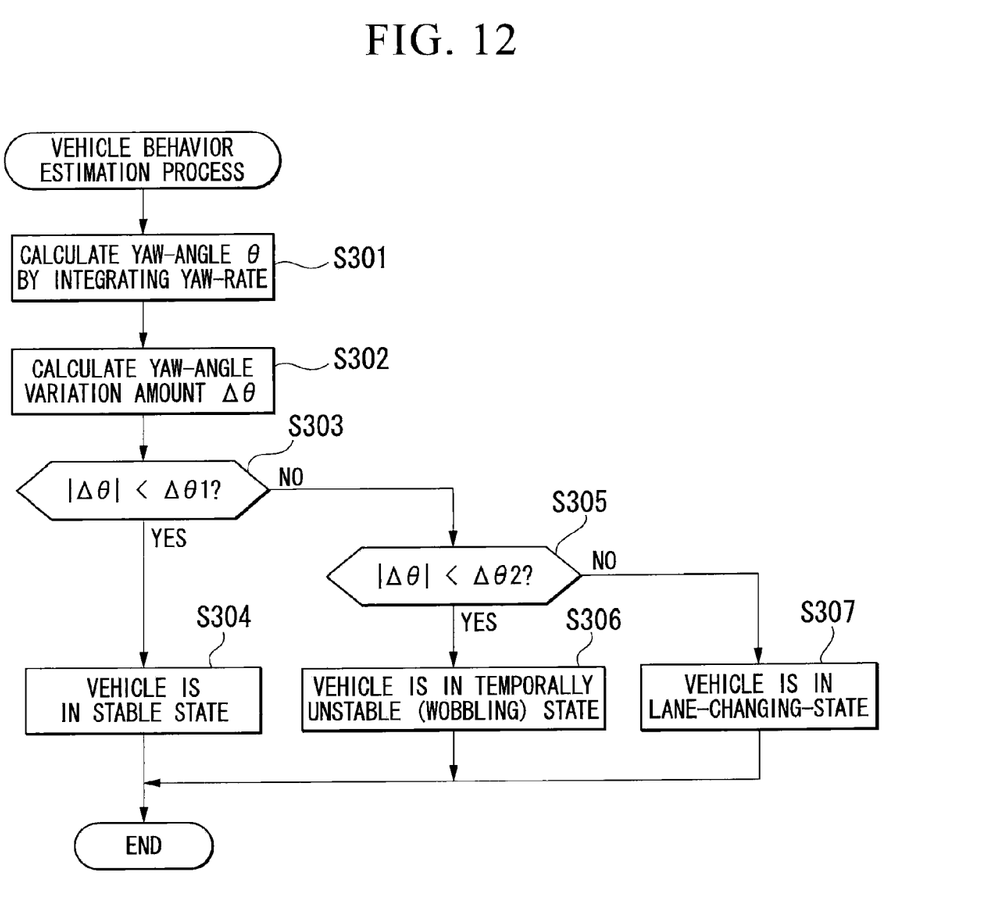
FIG. 12 is a flow chart showing a second vehicle behavior estimation process in the vehicle travel control apparatus according to the embodiment.

The vehicle behavior estimation process shown in the flow chart of FIG. 10 is a method of estimating the behavior of the present vehicle based on the lateral movement amount $\Delta Y$ of the present vehicle, while the vehicle behavior estimation process shown in the flow chart of FIG. 12 is a method of estimating the behavior of the present vehicle based on the yaw-angle variation amount $\Delta \theta$ of the present vehicle. Either of those two methods may be implemented.

The method of estimating the behavior of the present vehicle based on the lateral movement amount $\Delta Y$ of the present vehicle will be explained hereinafter, with reference to the flow chart of FIG. 10. The vehicle behavior estimation process shown in the flow chart of FIG. 10 is performed repeatedly at a predetermined time interval.

In step S201, a yaw-angle $\theta$ is calculated by integrating the yaw-rate of the present vehicle detected by the yaw-rate sensor 11.

Thereafter, the process proceeds to step S202, and calculates yaw-angle variation amount $\Delta \theta$ in a predetermined amount of time t1.

Thereafter, the process proceeds to step S203, and the process calculates the travel distance (mileage) $\Delta X$ of the present vehicle in the predetermined amount of time t1, based on the vehicle speed of the present vehicle detected by the vehicle speed sensor 13.

Figure 11:
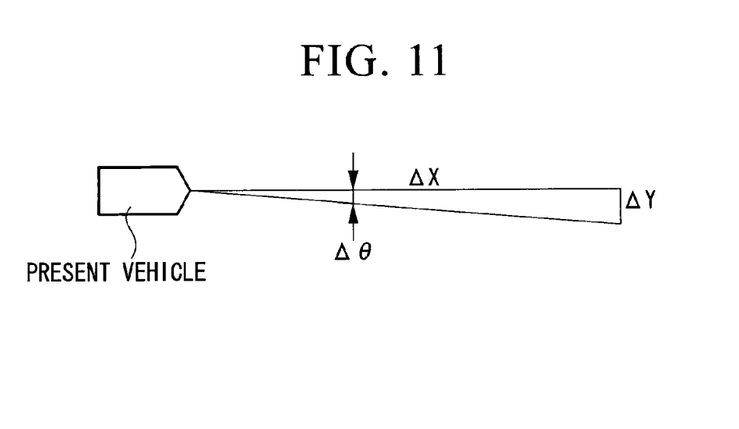
FIG. 11 is a drawing illustrating the principle to calculate the lateral movement amount of the present vehicle.

Thereafter, the process proceeds to step S204, and the process calculates the lateral movement amount $\Delta Y$ of the present vehicle in the predetermined amount of time t1. Since the travel distance $\Delta X$, the lateral movement amount $\Delta Y$, and the yaw-angle variation amount $\Delta \theta$ are in the relationship shown in FIG. 11, the lateral movement amount $\Delta Y$ of the present vehicle can be calculated using the following formula (I).

$$\Delta Y = \Delta X \cdot \tan \Delta \theta \quad (1)$$

Thereafter, the process proceeds to step S205, and the process determines whether the absolute value of the lateral movement amount $\Delta Y$ in the predetermined amount of time t1 is smaller than a predetermined threshold amount (second predetermined amount) $\Delta Y1$.

If the result of step S205 is 'Yes' ($|\Delta Y| < \Delta Y1$), the process proceeds to step S206, and the process determines that the present vehicle is in a stable state (stable-movement-state). Thereafter, the present process ends.

If the result of step S205 is 'No' ($|\Delta Y| \geq \Delta Y1$), the process proceeds to step S207, and the process determines whether the absolute value of the lateral movement amount $\Delta Y$ in the predetermined amount of time t1 is smaller than a predetermined threshold amount $\Delta Y2$. Here, the threshold amount $\Delta Y2$ is larger than threshold amount $\Delta Y1$ ($\Delta Y1 < \Delta Y2$).

If the result of step S207 is 'Yes' ($\Delta Y1 < |\Delta Y1| < \Delta Y2$), the process proceeds to step S208, and the process determines that the present vehicle is in a temporally unstable state (wobbling state). Thereafter, the present process ends.

If the result of step S207 is 'No' ($|\Delta Y| \geq \Delta Y2$), the process proceeds to step S209, and the process determines that the present vehicle is making a lane change (lane-changing-state). Thereafter, the present process ends.

The method of estimating the behavior of the present vehicle based on the yaw-angle variation amount $\Delta \theta$ of the present vehicle will be explained hereinafter, with reference to the flow chart of FIG. 12. The vehicle behavior estimation process shown in the flow chart of FIG. 12 is performed repeatedly at a predetermined time interval.

In step S301, a yaw-angle $\theta$ is calculated by integrating the yaw-rate of the present vehicle detected by the yaw-rate sensor 11.

Thereafter, the process proceeds to step S302, and calculates yaw-angle variation amount $\Delta \theta$ in a predetermined amount of time t2.

Thereafter, the process proceeds to step S303, and the process determines whether the absolute value of the yaw-angle variation amount $\Delta \theta$ in the predetermined amount of time t2 is smaller than a predetermined threshold amount (first predetermined amount) $\Delta \theta 1$.

If the result of step S303 is 'Yes' ($|\Delta \theta| \leq \Delta \theta 1$), the process proceeds to step S304, and the process determines that the present vehicle is in a stable state (stable-movement-state). Thereafter, the present process ends.

If the result of step S303 is 'No' ($|\Delta \theta| \geq \Delta \theta 1$), the process proceeds to step S305, and the process determines whether the absolute value of the yaw-angle variation amount $\Delta \theta$ in the predetermined amount of time t2 is smaller than a predetermined threshold amount $\Delta \theta 2$. Here, the threshold amount $\Delta \theta 2$ is larger than threshold amount $\Delta \theta 1$ ($\Delta \theta 1 < \Delta \theta 2$).

If the result of step S305 is 'Yes' ($\Delta \theta 1 \leq |\Delta \theta| < \Delta \theta 2$), the process proceeds to step S306, and the process determines that the present vehicle is in a temporally unstable state (wobbling state). Thereafter, the present process ends.

If the result of step S305 is 'No' ($|\Delta \theta| \geq \Delta \theta 2$), the process proceeds to step S307, and the process determines that the present vehicle is making a lane change (lane-changing-state). Thereafter, the present process ends.

As explained above, according to the vehicle travel control apparatus 1 of the embodiment, while the present vehicle performs the follow-travel control targeting the preceding vehicle, and a new vehicle-control-target candidate emerges between the present vehicle and the preceding vehicle, if the current behavior of the present vehicle is stable, and the new vehicle-control-target candidate was a still object, then the process does not assign the new candidate as the vehicle-control-target. Therefore, it can be prevented that non-vehicle objects on or above the road on the expected movement path become a vehicle-control-target, and become the target of follow-travel control.

Furthermore, while the present vehicle performs the follow-travel control targeting the preceding vehicle, and a new vehicle-control-target candidate emerges between the present vehicle and the preceding vehicle, if the current behavior of the present vehicle is stable, and the new vehicle-control-target candidate was a moving object, then, the process determines that another vehicle came between the present vehicle and the preceding vehicle. The process switches the assignment of the preceding vehicle, from the previous preceding vehicle to the new vehicle-control-target candidate, and performs the follow-travel control accordingly.

Furthermore, while the present vehicle performs the follow-travel control targeting the preceding vehicle, and a new vehicle-control-target candidate emerges between the present vehicle and the preceding vehicle, if the present vehicle is making a lane change, then the process determines that the new vehicle-control-target candidate is another vehicle in the next lane. The process switches the assignment of the preceding vehicle, from the previous preceding vehicle to the new vehicle-control-target candidate, and performs the follow-travel control accordingly.

Furthermore, while the present vehicle performs the follow-travel control targeting the preceding vehicle, and a new vehicle-control-target candidate emerges between the present vehicle and the preceding vehicle, if the current behavior of the present vehicle is not stable, and the present vehicle is not making a lane change, then the process determines that the present vehicle is in a temporally unstable state. In this case, the process does not assign the new candidate as the vehicle-control-target. Therefore, it can be prevented that non-vehicle objects on the side of the expected movement path become a vehicle-control-target, and become the target of follow-travel control.

(Other Embodiments)

The present invention is not limited to the above described embodiment.

For example, in the above described embodiment, while the present vehicle performs the follow-travel control, and a still object emerges between the present vehicle and the preceding vehicle, if the current behavior of the present vehicle is stable, then the process determine that the new candidate is not a preceding vehicle. However, instead of making such a determination, the process may delay the decision before determining that the candidate object is a preceding vehicle. In this case, by appropriately delaying the decision before determining that the candidate object is a preceding vehicle, since the still object moves out of the detection range of the present vehicle after the delay, so that it does not become a vehicle-control-target. As a result, the still object would not be assigned as the preceding vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle travel control apparatus comprising:
   an object detector which detects an object that exists in an advancing direction of a present vehicle;
   a yaw-rate detector which detects the yaw-rate of the present vehicle;
   a vehicle speed detector which detects the speed of the present vehicle;
   a movement path estimator which estimates the movement path of the present vehicle, based on the output of the yaw-rate detector and the output of the vehicle speed detector;
   a preceding vehicle assignment device which assigns the object as a preceding vehicle;
   a travel controller which performs a follow-travel control targeting the preceding vehicle;
   a still object determination device which determines whether the object detected by the object detector is a still object; and
   a stable-movement-state determination device which determines whether the present vehicle is, in a stable-movement-state, based on the output of the yaw-rate detector, wherein the preceding vehicle assignment device maintains the previous preceding vehicle assignment when:
   the present vehicle performs the follow-travel control targeting the preceding vehicle;
   the object detected at a position between the preceding vehicle and the present vehicle is determined to be the still object by the still object determination device;
   the present vehicle is determined to be in the stable-movement-state by the stable-movement-state determination device; and
   the stable-movement-state determination device determines that the present vehicle is in the stable-movement-state, when the absolute value of the integral value of the yaw-rate over a predetermined period is equal to or less than a predetermined value.

2. The vehicle travel control apparatus according to claim 1, wherein
   when:
      the present vehicle is performing the follow-travel control targeting the preceding vehicle by the travel controller;
      the object detected at a position between the preceding vehicle and the present vehicle is determined not to be a still object by the still object determination device; and
      the present vehicle is determined to be in the stable-movement-state by the stable-movement-state determination device,
   the preceding vehicle assignment device assigns the object determined not to be a still object as the preceding vehicle.

3. The vehicle travel control apparatus according to claim 1, wherein
   when:
      the present vehicle is performing the follow-travel control targeting the preceding vehicle by the travel controller; and
      the present vehicle is determined to be in a lane-changing-state by the stable-movement-state determination device, the preceding vehicle assignment device assigns the object detected between the preceding vehicle and the present vehicle as the preceding vehicle.

4. The vehicle travel control apparatus according to claim 1, wherein
when:
the present vehicle is performing the follow-travel control targeting the preceding vehicle by the travel controller; and
the present vehicle is determined to be in an unstable state by the stable-movement-state determination device,
the preceding vehicle assignment device does not assign the object detected between the preceding vehicle and the present vehicle as the preceding vehicle.

5. A vehicle travel control apparatus comprising;
an object detector which detects an object that exists in an advancing direction of a present vehicle;
a yaw-rate detector which detects the yaw-rate of the present vehicle;
a vehicle speed detector which detects the speed of the present vehicle;
a movement path estimator which estimates the movement path of the present vehicle, based on the output of the yaw-rate detector and the output of the vehicle speed detector;
a preceding vehicle assignment device which assigns the object as a preceding vehicle;
a travel controller which performs a follow-travel control targeting the preceding vehicle;
a still object determination device which determines whether the object detected by the object detector is a still object; and
a stable-movement-state determination device which determines whether the present vehicle is in a stable-movement-state, based on the output of the yaw-rate detector, wherein the preceding vehicle assignment device maintains the previous preceding vehicle assignment when:
the present vehicle performs the follow-travel control targeting the preceding vehicle;
the object detected at a position between the preceding vehicle and the present vehicle is determined to be the still object by the still object determination device;
the present vehicle is determined to be in the stable-movement-state by the stable-movement-state determination device; and
the stable-movement-state determination device determines that the present vehicle is in a stable-movement-state, when the absolute value of a lateral movement amount of the present vehicle in a predetermined period, calculated based on the yaw-rate and the speed of the present vehicle, is equal to or less than a predetermined value.

6. The vehicle travel control apparatus according to claim 5, wherein
when:
the present vehicle is performing the follow-travel control targeting the preceding vehicle by the travel controller;
the object detected at a position between the preceding vehicle and the present vehicle is determined not to be a still object by the still object determination device; and
the present vehicle is determined to be in the stable-movement-state by the stable-movement-state determination device,
the preceding vehicle assignment device assigns the object determined not to be a still object as the preceding vehicle.

7. The vehicle travel control apparatus according to claim 5, wherein
when:
the present vehicle is performing the follow-travel control targeting the preceding vehicle by the travel controller; and
the present vehicle is determined to be in a lane-changing-state by the stable-movement-state determination device,
the preceding vehicle assignment device assigns the object detected between the preceding vehicle and the present vehicle as the preceding vehicle.

8. The vehicle travel control apparatus according to claim 5, wherein
when:
the present vehicle is performing the follow-travel control targeting the preceding vehicle by the travel controller; and
the present vehicle is determined to be in an unstable state by the stable-movement-state determination device,
the preceding vehicle assignment device does not assign the object detected between the preceding vehicle and the present vehicle as the preceding vehicle.

* * * * *